Oct. 24, 1950

B. NOBLE 2,527,147

MASTER BATCHER

Filed Feb. 28, 1949

INVENTOR.
BERT NOBLE
BY
ATTORNEY

Oct. 24, 1950     B. NOBLE     2,527,147
MASTER BATCHER

Filed Feb. 28, 1949     3 Sheets-Sheet 2

INVENTOR.
BERT NOBLE
BY
ATTORNEY

Oct. 24, 1950   B. NOBLE   2,527,147
MASTER BATCHER
Filed Feb. 28, 1949   3 Sheets-Sheet 3
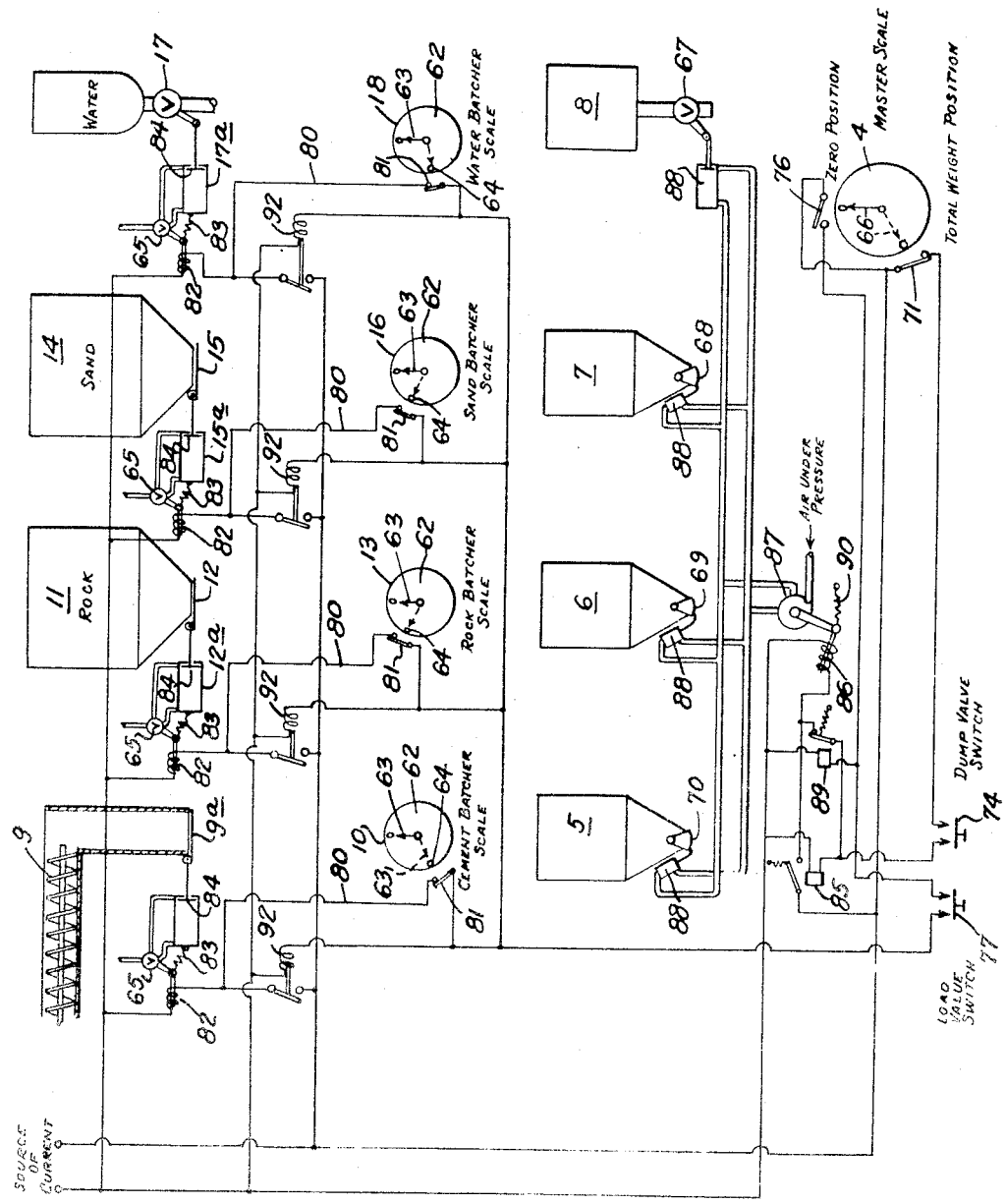
INVENTOR.
BERT NOBLE
ATTORNEY Patented Oct. 24, 1950

2,527,147

UNITED STATES PATENT OFFICE 2,527,147

MASTER BATCHER

Bert Noble, Winters, Calif.

Application February 28, 1949, Serial No. 78,879

17 Claims. (Cl. 249—14)

This invention relates to improvements in batching apparatus and particularly to improvements in such mechanisms where there are a plurality of different elements to be combined into a batch and then mixed and where it is important that none of the elements can be introduced into their respective batchers until each batcher has been emptied of its previous load and where none of the elements can be dumped until the predetermined total weight for the batch has been weighed out into the several batchers.

One problem solved by this device is that it gives a check on the whole operation whenever more than one batcher is used. Also it avoids having a series of interlocks between the several batchers to make it impossible to start or to dump a batch that would be incorrect in composition. Another problem solved is to speed up the batching operation by permitting each one of a group of batchers to be filled simultaneously and still make possible a check on the composition of the entire batch. Another problem solved is to avoid having to throw away a batch such as must be done where the batch is made up on a single scale batcher with each element added to the batch in sequence and the total in the scale reads over or under. The operator will not be able to ascertain which one of the several aggregates is over or under or which may even be missing altogether from the batch. Up to now all the operator could do in this situation was to discard the batch because it would not pass inspection.

The objects of the present invention are, therefore, to provide a high-speed, accurate, proportioning device for weighing into a single batch, a plurality of separate elements; to provide a batching mechanism in which there is no opportunity for an operator to make an error where in the present day multi-million dollar concrete structures, accuracy is necessary to protect the structure against cracks and other concrete failures; to provide a batcher in which the accuracy is close enough so that the elements may be paid for on the basis of the weights measured on the batching scale; to provide a batching mechanism which calls for the government agency on a large dam, for example, to supply a minimum of inspection; to provide a plurality of separate batchers, each of which can be in operation simultaneously for measuring out its particular element, and in which there is a master scale to check on the correctness of these several simultaneous operations; to provide a batcher in which any failure of the master scale to register the correct weight can be corrected by going to the several individual batcher scales for each type of element and then by correcting the amount of material in the batcher that is over or under, avoid the discard and loss of valuable materials; to provide in a multiple batcher means whereby it is impossible to dump a batch until the material weighed up equals a predetermined total; and to provide in a multiple batcher means whereby it is impossible to start mixing a new batch until all the material weighed up for the preceding batch has been dumped.

This latter feature safeguards the whole construction operation against the type of batcher failure encountered in the past with prior art machines on a large dam project where the cement hung up in the batcher and all the other elements of the mix were mixed and poured, but the lack of the cement was not discovered until the dam forms were removed. The contractor found in those cases only gravel which had to be chipped out and new concrete poured. This was only discovered because the particular defective batch happened to have been poured against the form. On that dam no one knew how many such defective batches had been dumped in the interior of the slab and they never could be detected until the dam might collapse at some future time.

In the present invention, the operator cannot start to measure a new batch until every one of the batchers has been emptied into the mixer. If the cement or any other constituent hangs up in its batcher, the operator is unable to move the lever to start another batch.

Other objects and advantages of the present device will become clear from the following description and from the drawings which are offered as one embodiment of the invention in compliance with U. S. Revised Statute, section 4888.

Different types of structures made of concrete call for different combinations of elements. For example, concrete for heavy dams require the addition of boulders or large rock, ice and admixtures. The most usual concrete mixture is made up of cement, several sizes of rock and of sand. The simplest form of concrete would be made from sand, rock, cement and water. Because techniques in concrete composition change from time to time, I shall describe my invention as it would be applied in making up batches of the basic elements of sand, rock, cement and water. It is to be understood that present day technique calls for more elements such as ice, several sizes of rock, admixtures, etc. To care for these in my device, additional batchers would be suspended from the master frame but this amounts only to a multiplication of the basic units herein illustrated.

In the drawings:

Fig. 7 is a diagrammatic view showing the lower ends of four material bins, the weigh hoppers for each and the circuits by which control of dumping and loading is effected.

Figures 1, 6:
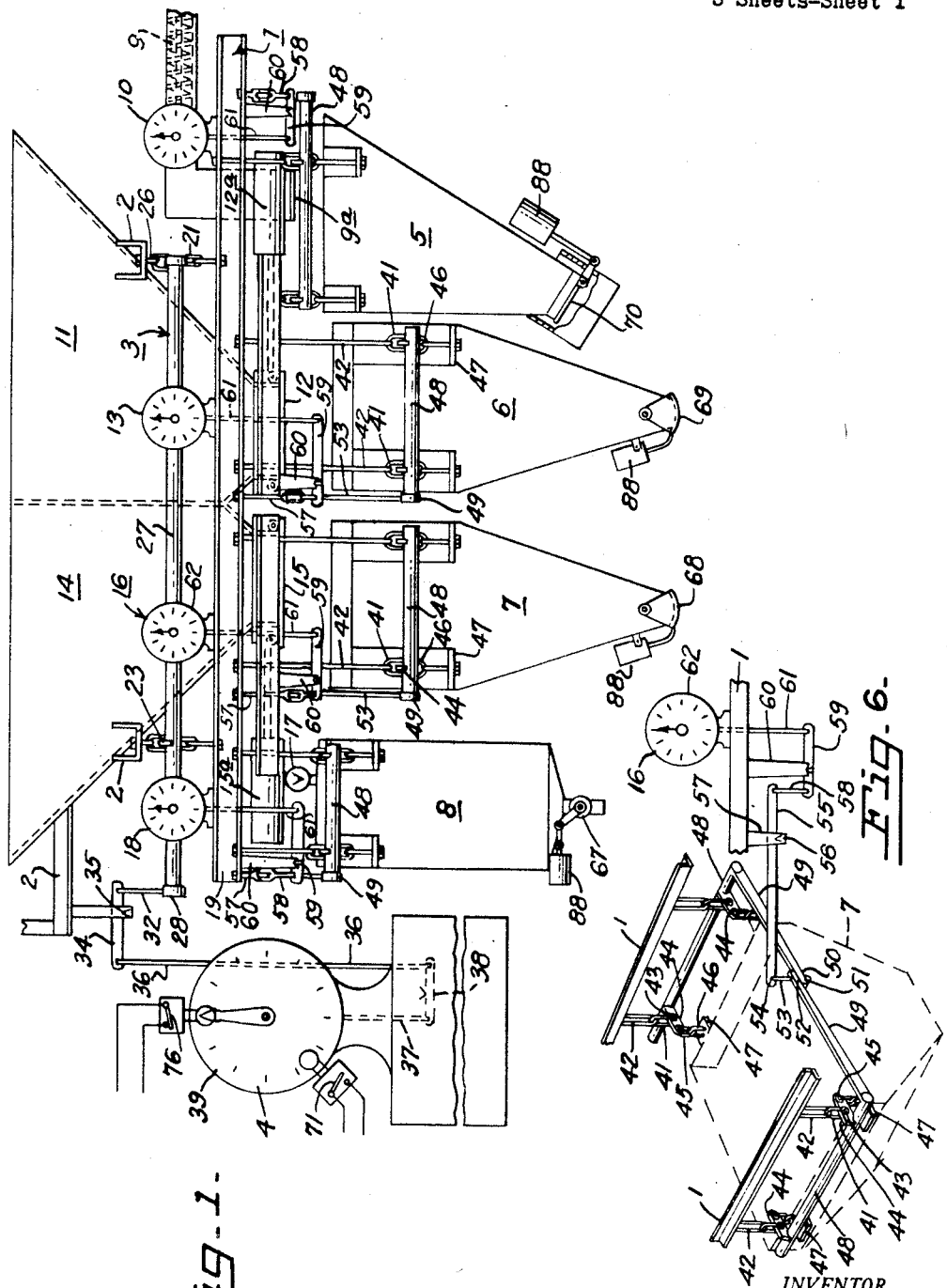
Fig. 1 is a view in elevation, showing the scale dial side of the device with the parts in most particulars shown diagrammatically.
Fig. 6 is a diagrammatic isometric view of the scale system of an individual batcher suspended from the master scale frame.

The device is composed of a master scale frame or platform 1, suspended from a stationary supporting frame 2 by means of a scale lever system 3 connected to a master scale 4 and having a plurality of individual batchers 5, 6, 7, and 8 suspended from the master scale.

Broadly, the invention comprises a master scale system from which all the individual batchers and their individual scales and scale systems are suspended.

In the drawings, four such individual batcher systems have been shown for purposes of illustration. More or fewer can be used depending upon the requirements of the particular job on which the batcher is being used.

In the drawings are shown an individual cement batcher 5, an individual rock batcher 6, an individual sand batcher 7, and an individual water batcher 8, all suspended from the master scale frame 1 each by its own scale lever system.

Each of these batchers has a storage bin with an outlet positioned above it with a feed means to admit its particular element into its batcher until the scale for its batcher registers the predetermined weight for that element of the mix at which time its feed means is automatically shut off.

The cement batcher 5 has above it a storage bin (not shown) from which a usual feed screw 9 conveys cement to the batcher 5. When the cement scale 10 registers the desired predetermined weight of cement in the batcher 5, the feed screw 9 shuts off and the gate 9a closes.

The rock batcher 6 has above it a storage bin 11 with a feed gate 12 which is opened and closed by a power actuated means 12a, well known in this art and therefore not detailed. The scale 13 for the rock batcher 6 is of the type (like those for the sand, water and cement) which can be set to weigh a predetermined amount of rock and when that amount of rock is in the batcher, the scale actuates a control system which closes the feed gate 12.

The sand batcher 7 has above it a storage bin 14 with a feed gate 15 and its own scale 16. Its operation is identical with the rock batcher.

The water batcher 8 has a pipe and valve 17 in position above it to dump water into the batcher. The valve in the pipe is opened and closed by a power actuated means 17a. The scale 18 for the water batcher 8 is of the same type as above described and shuts off the flow of water into the batcher 8 when the water in the batcher reaches the predetermined amount.

These four batchers (and more or fewer in cases where there are more or fewer elements to be weighed into a particular batch) each functions to weigh up simultaneously its predetermined amount of its particular element according to the scale settings on the several individual batcher scales 10, 13, 16 and 18. These four batchers and their scales are all suspended entirely on the main scale frame 1, therefore, the total of the weights recorded on the individual scales 10, 13, 16 and 18 will equal the total weight recorded on the master scale 4.

For example, in getting up a batch composed of 1600 pounds of cement, 4800 pounds of sand, 9200 pounds of rock and 800 pounds of water, the total weight would be 16,400 pounds. The master scale 4 would register 16,400 pounds. The cement scale 10 would register 1600 pounds, the sand scale 16 would register 4800 pounds, the rock scale 13 would register 9200 pounds and the water scale 18 would register 800 pounds. The total of these individual scale readings would equal the reading on the master scale on which the individual batcher weights are accumulated.

The reason in the present invention for suspending the individual batchers 5, 6, 7 and 8 from the main scale frame 1 is that in this way several advantages are obtained.

First, the batching operation is speeded up because each of the elements can be weighed simultaneously.

Second, by having the master scale 4, any error (over or under) of any one or more of the individual batchers will be detected.

Third, an error when detected on the master scale 4 can be located by examining the readings of the individual scales 10, 13, 16 and 18. Then the correct weight can be put in the batcher in error and the total batch brought to its correct weight.

Fourth, the failure of any batcher 5, 6, 7 or 8 to dump all or part of its load will be detected by the master scale, for the master scale 4 will not read zero until all the elements have been emptied from all the batchers.

While this invention and the above advantages can be obtained in a manual operation where the operator examines the master scale before dumping the elements from each batcher, in its preferred form, the invention includes the provision, hereinafter described, for the master scale 4 to have automatic means whereby the individual batcher cannot be dumped until the master scale reads the correct total; and further, the feed gates to the batchers 5, 6, 7 and 8 cannot again be opened until the master scale 4 has a zero reading. This latter feature assures the plant engineer that mistakes of omitting the cement or any other element from a batch, as has happened before, cannot occur with this machine.

With the foregoing introduction to the broad features of the invention, the details of structure of the illustrated apparatus will now be explained.

Batchers of the type herein described are usually employed on the building sites of large dam projects. One embodying this invention is in use at the McNary dam on the Columbia river between Oregon and Washington. A steel framework (not shown) is erected on a suitable foundation, and comprises a stationary frame member on which the bins 11, 14 and the cement feed screw 9 and the water pipe and valve 17 are supported. Stationary frame members 2 secured on the bins or the frame, provide a support for the lever system 3 of the master scale frame 1. It is to this master scale frame 1 that the individual batchers 5, 6, 7 and 8 are attached, each by its own scale system.

Figure 2:
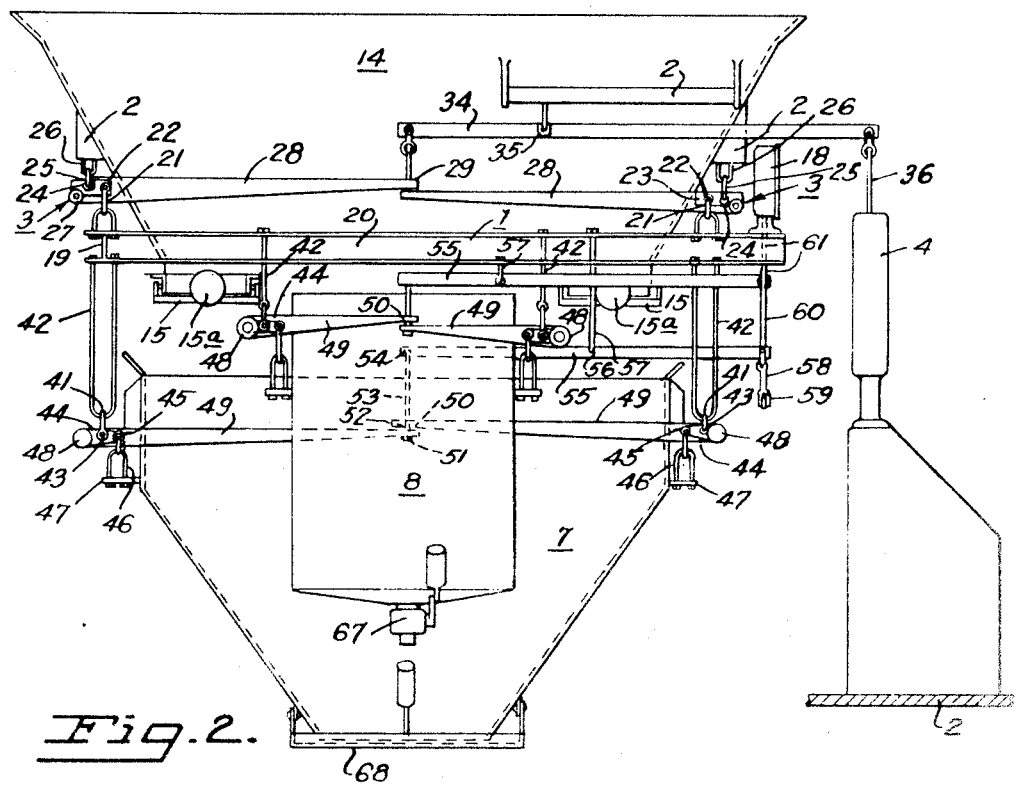
Fig. 2 is a similar view looking from the left toward the left hand end of Fig. 1.
Figure 3:
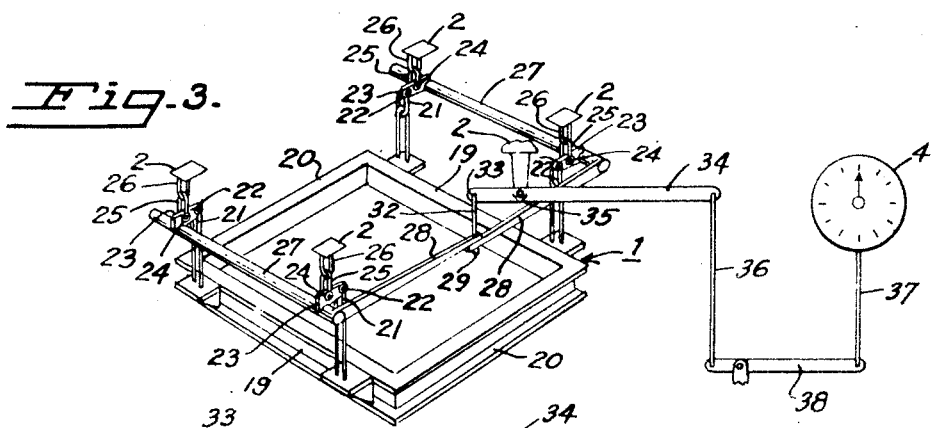
Fig. 3 is a diagrammatic isometric view of the scale system of the master scale frame.
Figures 4, 5:
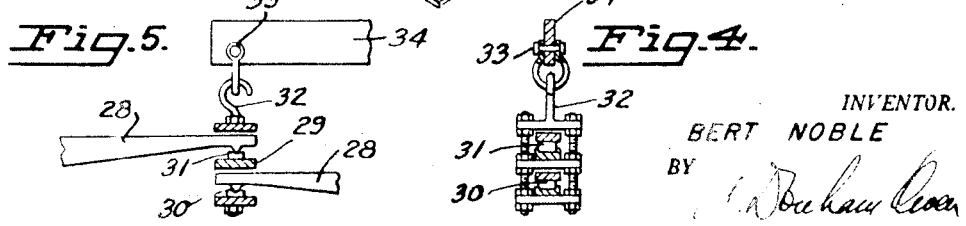
Figs. 4 and 5 show more detail on the connection of the splice arms to the splice loop.

The master scale system (Figs. 1, 2 and 3)

The master scale includes the master frame 1 here made up in the form of a rectangular frame of I beams 19 and 20. From the master frame are suspended all the individual batchers 5, 6, 7 and 8, so that the master frame can provide a means for weighing on one scale the elements weighed into the individual batchers. The master scale frame 1 is mounted on a scale lever system which includes the four loops 21 bearing on knife edges 22 projecting from the scale levers 23. Another set of knife edges 24 on the levers 23 are offset in relation to the edges 22 and these are supported on the loops 25 secured to the stationary frame members 2 by the hooks 26. There is a longitudinal scale lever connection on the sides of the frame 1, extending parallel to the sides 19. These may be made of pipe 27 to which the scale levers 23 are welded. On one end of each pipe 27 is secured a splice arm 28. These extend inwardly and their ends overlap at 29 where they are connected by knife edges 30, 31 to the splice loop 32 which is connected by a knife edge 33 to one end of the extension lever 34 pivoted on a knife edge at 35 to the stationary frame 2. By means of additional rods 36 and 37 and the lever 38 movement of the master scale frame 1 is transmitted to the scale dial 39 on the master scale 4 with as little friction loss as possible. The scale 4 is supported on the same rigid base as the stationary frame 2.

The individual batcher scale systems (Figs. 1, 2 and 6)

Each individual batcher 5, 6, 7 and 8 is suspended from the master scale frame 1 and has its own scale 10, 13, 16 and 18, also mounted on the master scale frame 1. Each batcher is connected to its own scale by a lever system. The system for each batcher is alike in principle, therefore, the same reference numerals are used and the sand batcher lever system will be the one described. (See Fig. 6.)

The batcher includes a hopper or tank 7 (shown in dotted lines in Fig. 6) suspended below the master scale frame 1 by means of loops 41 secured to hooks 42 in the frame 1. The loops bear on knife edges 43, projecting from the scale levers 44. Another set of knife edges 45 on the levers 44 are offset in relation to the edges 43 and these are engaged by loops 46 connected to the brackets 47, projecting from the sides of the batch hopper.

The scale levers 44 are secured to the pipe connections 48 on each side of the hopper 7, and the connections 48 each have a splice arm 49 secured near one end. The splice arms 49 extend inwardly and their ends overlap at 50 where they are connected by knife edges 51, 52 to the splice loop 53, which is connected by a knife edged loop 54 to one end of the extension lever 55 pivoted on a knife edge at 56 hung from the master scale frame 1 on the rod 57. The other end of the lever 55 is connected at 58 to a second extension lever 59, pivoted to the master scale frame 1 by a bracket 60. A rod 61 transmits movement of the batch hopper to the scale dial 62 on the scale 16.

The individual automatic batchers (see Fig. 7)

Each of the batchers 5, 6, 7 and 8 has a separate automatic means for closing the feed valve in the hopper above it. This includes its scale 10, 13, 16 and 18 respectively, each scale having an adjustable contact 64 which can be moved around the scale dial and set to weigh out into its batch hopper a predetermined desired amount of material.

The individual batcher mechanism is not described here in great detail because it is a well known device. However, it is the occasional failure of these individual batchers in weighing into themselves the correct amount of material that gives rise to some of the problems solved by this invention.

The invention solves the problem by having all the individual batchers 5, 6, 7, 8 suspended from a master scale frame 1 with a master scale 4 on which is registered the total of the weights on each of the individual batcher scales 10, 13, 16 and 18. If these equal the predetermined total the batchers can be emptied, otherwise they cannot be emptied.

In its preferred form—shown diagrammatically in Fig. 7—the master scale control includes in the scale 4 a normally open contact means 76 which is closed when the scale hand 66 comes into its zero reading position and another normally open contact means 71 which is closed when the hand 66 swings around into its total weight position. In practice, a photo-electric type of contact means is used at those two points so as not to impose any frictional load on the scale. The contact means 71 is adjustable around the scale dial so that the total weight can be varied at will.

The master scale—total weight position

The purpose here is to interpose a control means which will not permit the individual batcher dump valves 67, 68, 69 and 70 to be opened to empty the materials they hold until the master scale hand 66 points to the total weight predetermined for that particular batch. If the master scale hand 66 is below or above the predetermined total weight position, the operator cannot dump the batch elements from the individual batchers. This indicates to him that some one or more of the batchers contains an incorrect weight of its particular element. Before he can dump the elements from the batchers, the correct weight must be obtained in each batcher. This is done by adding or removing material as need be. When the correction is made, the master scale hand 66 will then come into position to close the contact 71 in the electrical circuit to the dump valve switch. Then when the operator moves the dump valve switch 74, he will close the circuit to the several dump gates and thereby dump the several elements from the individual batchers.

The master scale—zero weight position

After actuating the dump gates as described above, the master scale hand 66 moves back toward the zero position. If it goes all the way to its zero position, it will close the normally open contact 76 in the electrical circuit to the load valve switch 77 and will simultaneously break the circuit which was holding the batcher dump valves open. Then when the operator moves the load valve switch 77 into position, it will open the feed gates 9a, 12, 15 and 17. If the master scale hand 66 does not go back all the way to its zero position, the operator will not be able to accomplish anything by actuating the load valve switch 77 because the contact 76 will be open.

He will know that some one of the batchers 5, 6, 7 or 8 still has in it part of its load of material from the previous batch. He can detect which one this is by examining the dials on the scales 10, 13, 16 and 18, and then by loosening the material retained in the unemptied batcher he can complete the dumping operation.

This will allow the master scale hand 66 to return to its zero weight position, thereby closing the contact 76 in the electrical circuit to the load valve switch 77 and also closing the gates 67, 68, 69 and 70 on the batchers 5, 6, 7 and 8. Then the operator can start the next batch by actuating the load valve switch 77.

One form of circuit to accomplish the above result is shown in Fig. 7. To avoid complications, the same reference numerals are applied to the individual batcher circuits as they are identical.

The automatic shutoff for each individual batcher includes an electrical circuit 80 (see Fig. 7) with a photoelectric relay 81 which is normally closed and which opens the circuit 80 when the batcher scale hand 63 reaches the adjustable contact 64. When the circuit 80 opens it de-energizes the coil 82 allowing the spring 83 to move the air valve 65 which introduces air under pressure into the left end of the ram 84 which effects a closing of the feed gate above that partcuilar batcher.

Each individual batcher scale 10, 13, 16 and 18 has such a hand 63 adapted to move from a zero position where it is pointing straight up to a predetermined load position shown in dotted lines. In its latter position (which is adjustable) each scale hand 63, by means of a photoelectric relay 81 opens the normally closed contact 81 and by means of the circuit previously described closes its respective feed gate 9a, 12, 15 or 17. This happens on each of the individual batchers as its scale hand 63 comes up to the predetermined load position.

When all the individual batchers have reached their respective full load positions, the master scale hand 66 will have come up to its predetermined total load setting and by means of a photoelectric relay 71 which is normally open will condition the dumping circuits for actuation if the dump valve switch 74 is closed. When the operator closes the dump valve switch 74 the dump gates 67, 68, 69 and 70 on the individual batchers will be actuated each by its electrically controlled circuit.

An illustrative circuit is shown in Fig. 7 which requires only a momentary contact of the dump valve switch 74 until the normally open relay 85 is closed for then the normally closed relay 89 supplies current to the relay 85 and keeps the current flowing to the coil 86 which holds the air valve 87 in position to pass air under pressure into the air rams 88 which hold the batcher dump gates open until the master scale hand 66 has returned to its zero position on the dial. The circuit of the relay 85 is broken when the scale hand 66 returns to its zero position because this actuates the photoelectric relay 76 and closes its normally open contact which opens the normally closed contact 89 in the holding coil circuit. This de-energizes the coil 86 and the spring 90 shifts the air valve 87 so that the air rams 88 close the gates on the batchers.

Assuming that the operator has dumped the batch and the master scale hand 66 has not returned to its zero weight position, the operator will not be able to close the dump gates 67, 68, 69 and 70 on the batchers or to reload them by actuating the load valve switch 77 because the normally open contact 76 in the feed gate valve circuit remains open and it will stay open until the master scale hand 66 is returned to its zero weight position. If the hand does not return to its minimum predetermined weight position the operator will most likely find that some of the material has not been emptied from one or more of the individual batchers. This means that the operator cannot make the mistake of omitting from a batch part or all of any of the elements of the mix.

After pressing the load valve switch 77, unless the master scale hand 66 has come to the predetermined total weight position, the operator cannot dump any of the individual batchers by moving the dump switch 74 because the normally open contact 71 will still be open leaving the electrical dumping circuit disabled. Thus the operator will be forced to correct the weight inaccuracy in the individual batchers before they can be dumped.

*Operation*

A summary of the operation of the device beginning with the first operation of the day follows:

At the close of any work period it is preferable that all the ingredients be emptied from the individual batchers 5, 6, 7 and 8. This will allow the hand 66 on the master scale 4 to return to its zero position where it closes the normally open photo electric relay 76. When the relay 76 closes it completes the circuit to the relay 89 whose normally closed contacts open and release the relay 95 so that its contacts assume their normally open position and de-energize the coil 86 so the spring 90 can shift the air valve 87 to a position where it admits air under pressure to each of the rams 88 so they close the batcher dump gates 67, 68, 69 and 70.

When the relay 76 closes it also conditions the loading circuit so that when the operator is ready to start a new batch he can do so by pressing the load valve switch 77.

Looking now at the condition of the individual batcher control circuits, at the close of a work period, the hand 63 on each batcher scale 10, 13, 16 and 18 is at its zero point. This means that the normally closed contacts on each photo electric relay 81 are closed. The spring 83 is holding each air valve 65 in position where the rams (84, 12a, 15a and 17a) are caused to hold the gate (9a, 12, 15 or 17) closed.

We come now to the start of a work period. Each of the hoppers 11 and 14 is filled, there is water ready to flow through the valve 17 and cement ready to be fed by the screw 9. The operator sets each of the adjustable contacts 64 on the individual scales 10, 13, 16 and 18 to weigh out the quantity of each ingredient desired. The example given earlier in the specification was 1600 pounds of cement, 4800 pounds of sand, 9200 pounds of rock and 800 pounds of water. Next the operator sets the adjustable photo electric relay 71 on the master scale 4 at the point where it will be actuated when the scale registers the sum of the foregoing weights or 16,400 pounds.

The machine is now ready to weigh out batches of the above proportions. The operator presses the load switch valve 77 which closes the circuits to the normally open-contact relays 92. This energizes the coils 82 which move the air valves 65 so that air under pressure is introduced into each ram (84, 12a, 15a, and 17a) and each ingredient of the mix begins to pour into its respective hopper 5, 6, 7 and 8.

Once the open contact relay 92 is closed by a momentary closing of the load valve switch 77, the relay 92 continues to receive current through the circuit 80 and the normally closed photo electric relay 81. Each individual hopper continues to load while the others are loading, but each one can discontinue loading independently of the others and each does so as soon as the material weighed into it carries the scale hand 63 around to the predetermined point 64. When each hand 63 comes to this point it energizes the normally closed photo electric relay 81 which breaks the circuit 80 and de-energizes the normally open relay 92 which breaks the circuit to the coil 82 and the spring 83 shifts the air valve 65 which introduces air into the ram and the hopper gate (9a, 12, 15 or 17) is closed. When each of the individual batchers has thus completed its weighing cycle and each batcher contains the predetermined amount of material, this brings the hand 66 on the master scale 4 to its predetermined total weight position—16,400 pounds in the example.

If the hand 66 actually holds at this point on the master scale, it will actuate the normally open-contact photo electric relay 71 and will condition the dumping circuit. The operator presses the dump valve switch 74 which closes the normally open relay 85 and energizes the coil 86 which moves the air valve 87 so that it introduces air under pressure to each of the rams 88 to open the dump gates 67, 68, 69 and 70 on the batchers. The normally closed relay 89 continues the supply of current to the relay 85 after the momentary closing of the switch 74 first closed the relay 85, and until the master scale hand 66 returns to its zero position. When the hand 66 reaches its zero position this is a positive indication that all the ingredients in the several batches have been dumped and they are ready for another batching cycle.

The normally open photo electric relay 76 is actuated when the hand 66 comes into its zero position and closes the contacts so that the normally closed relay 89 is energized. This breaks the circuit to the normally open relay 85 and when it opens it de-energizes the coil 86 and allows the spring 90 to turn the air valve to where it introduces air into the other end of each ram 88 and the dump gates 67, 68, 69 and 70 are closed.

Closing of the normally open relay 76 by the scale hand 66 also conditions the circuit so that if the operator presses the load valve switch 77 the operation cycle just described will be repeated.

If during a loading operation, the hand 66 on the master scale does not stop at the predetermined load point and thereby actuate the normally open-contact photo electric relay 71 the operator cannot dump the ingredients because the contacts of the relay 71 will still be open and pressing the dump valve switch 74 will do no good. In this situation the operator can examine the scale on each individual batcher to determine where the error in the mix exists. It may be that an individual batcher weighed out too much or too little with the result that the master scale total is incorrect. The operator can add to or take from any batcher whatever is necessary to get a correct result. When the correct amount of ingredients is in the batchers the normally open relay 71 will close and the batch can be dumped.

If during a dumping operation, the hand 66 on the master scale does not go back to the zero position and thereby actuate the normally open-contact photo electric relay 76, the operator cannot start a new batch because the contacts of the relay 76 will still be open and pressing the load valve switch 77 will do no good. In this situation the operator can examine the scale on each individual batcher to determine where some of the material still remains in the batcher. It is most likely that some cement has hung up in the cement batcher and the operator can cure this by knocking the cement loose so it will fall out of the batcher. When all the ingredients have been removed from all the individual batchers the normally open relay 76 will close and the next batch can be weighed up.

While I have shown the interlock controls between the master scale and the dump valves and between the master scale and the feed valves as being electrically actuated, they may be actuated electronically or mechanically using parts that are presently known. Either will accomplish the purpose of my invention which broadly is—

(a) To provide a simple, rugged, foolproof multiple batching plant in which the ingredients entering into the composite mixture can be weighed simultaneously and individually into separate batchers and cannot be dumped from any of the batchers until the total weight of the measured ingredients equals the predetermined weight as shown on the master scale; and (b) To provide in such a machine interlocked controls so that reloading of the separate batchers cannot be commenced until all the ingredients in each of them from the previous batch has been dumped so that the master scale will return to its predetermined minimum weight position.

What I claim is:

1. A weighing device adapted for weighing up a composite mixture of predetermined content including: a base support; a plurality of supply means, each for feeding a particular ingredient to go into said mixture; a feed gate attached to each of said supply means; individual means to actuate each of said feed gates; a separate ingredient-receiving container adjacent each of said gates; a dump valve in each of said containers; means to actuate each of said valves; an individual weighing scale which supports each of said separate containers; a master weighing scale supported on said base and which in turn supports said individual weighing scales and containers; and an interlock means between said master scale and said dump valve actuating means, whereby the latter cannot be actuated unless said master scale is supporting a predetermined maximum weight of measured ingredients.

2. A weighing device adapted for weighing up a composite mixture of predetermined content including: a base support; a plurality of supply means, each for feeding a particular ingredient to go into said mixture; a feed gate attached to each of said supply means; individual means to actuate each of said feed gates; a separate ingredient-receiving container adjacent each of said gates; a dump valve in each of said containers; means to actuate each of said valves; an individual weighing scale which supports each of said separate containers; a master weighing scale supported on said base and which in turn supports said individual weighing scales and containers; and an interlock means between said master scale and said feed gate actuating means, whereby the latter cannot be actuated unless said master scale is supporting a predetermined minimum weight of ingredients.

3. A weighing device adapted for weighing up a composite mixture of predetermined content including: a base support; a plurality of supply means, each for feeding a particular ingredient to go into said mixture; a feed gate attached to each of said supply means; individual means to actuate each of said feed gates; a separate ingredient-receiving container adjacent each of said gates; a dump valve in each of said containers; means to actuate each of said valves; an individual weighing scale which supports each of said separate containers; a master weighing scale supported on said base and which in turn supports said individual weighing scales and containers; and interlock means between said master scale and said dump valve actuating means and said feed gate actuating means whereby said feed gates cannot be opened until said master scale is supporting a predetermined minimum weight of ingredients and said dump gates cannot be opened until said master scale is supporting a predetermined maximum weight of measured ingredients.

4. In a device for weighing out a plurality of different ingredients, the combination of a rigid main frame; a plurality of individual containers, each having means for dumping ingredients which have been weighed into it, said dumping means for said containers including interlocked controls; a master scale means supported in said rigid main frame; individual scale means for each of said containers, said individual scales supporting said containers on said master scale means, said master scale means including a control interlocked with the aforesaid controls whereby said dumping means cannot be opened unless a predetermined weight of ingredients is indicated on said master scale means.

5. In a device for weighing out a plurality of different ingredients, the combination of a rigid main frame; a plurality of individual containers, each having means for dumping ingredients which have been weighed into it; a master scale means supported on said rigid main frame; individual scale means for each of said containers, said individual scales supporting said containers on said master scale means; separate means for feeding ingredients into each of said containers; individual control means for opening and closing each of said feeding means; and a master control on said master scale means interlocked with said individual control means whereby said feeding means cannot be opened unless a predetermined minimum weight is indicated on said master scale means.

6. In a batching plant, adapted to measure out batches of like composition of ingredients, the combination of a plurality of storage receptacles for each of said ingredients; gate means on each receptacle for controlling the flow of said ingredients; a plurality of containers adapted to receive ingredients from said receptacles; a common support means for said containers; an individual weighing mechanism separately securing each of said containers to said common support; a separate weighing mechanism supporting said common support means; and lock means for said separate weighing mechanism and said gate means whereby said gate means cannot be opened unless said separate weighing mechanism is sustaining a predetermined load.

7. In a batching plant, adapted to measure out batches of like composition of ingredients, the combination of a plurality of storage receptacles for each of said ingredients; gate means on each receptacle for controlling the flow of said ingredients; a plurality of containers adapted to receive ingredients from said receptacles; means for emptying said containers; a common support means for said containers; an individual weighing mechanism separately securing each of said containers to said common support; a separate weighing mechanism supporting said common support means; and lock means for said separate weighing mechanism and said emptying means, whereby said emptying means cannot be activated unless said separate weighing mechanism is sustaining a predetermined load.

8. In a batching plant, adapted to measure out batches of like composition of ingredients, the combination of a plurality of storage receptacles for each of said ingredients; gate means on each said receptacle for controlling the flow of said ingredients; a plurality of containers adapted to receive ingredients from said receptacles; means for emptying said containers; a common support means for said containers; an individual weighing mechanism separately securing each of said containers to said common support; a separate weighing mechanism supporting said common support means; and lock means for said separate weighing mechanism, said gate means, and said emptying means, whereby said gate means and said emptying means can only be opened at opposite times in the operation cycle when said separate weighing mechanism permits.

9. In a batching plant, adapted to measure out batches of like composition of ingredients, the combination of a plurality of storage receptacles for each of said ingredients; gate means on each said receptacle for controlling the flow of said ingredients; a plurality of containers adapted to receive ingredients from said receptacles; individual means for emptying said containers; a common support means for said containers; an individual weighing mechanism separately securing each of said containers to said common support; a separate weighing mechanism supporting said common support means; means for closing said gate means on each receptacle independently when its associated container reaches a predetermined weight; and an interlock control with said separate weighing mechanism and said individual emptying means whereby the latter cannot be activated until said separate weighing mechanism is sustaining a predetermined load.

10. In a batching plant adapted for weighing up separately and simultaneously and then discharging simultaneously a plurality of aggregates, the combination of a plurality of receptacles each containing aggregates to be used in a batch; a gate for each of said receptacles; means for opening and closing said gates; a batch container positioned adjacent each of said receptacles to receive aggregates therefrom; an outlet device for each container; means for opening and closing said outlet device; a master scale frame; a separate scale for each container secured to and supporting each container in said frame; a master scale supporting said master scale frame; a loading circuit having means for opening said gates only when said master scale is in the region of its zero position; and a dumping circuit having means for opening said outlet devices only when said master scale is in the region of its weighing position which represents the total of the aggregates intended to be weighed into said individual batch containers.

11. The device of claim 9 in which said interlock control also includes a control between said separate weighing mechanism and said gate means whereby the latter cannot be opened until said separate weighing mechanism is sustaining a predetermined minimum load.

12. The device of claim 10 in which there is an interlock between said loading and said dumping circuits, whereby return of said master scale to its zero position automatically closes the outlet devices on said batch containers as it conditions the loading circuit for activation.

13. A weighing device adapted for weighing up a composite mixture of predetermined content including: a base support; a plurality of supply means, each for feeding a particular ingredient to go into said mixture; a container adjacent each of said supply means and adapted to receive an ingredient therefrom; a dump valve in each of said containers; means to actuate each of said valves; an individual weighing scale which supports each of said containers; a master weighing scale supported on said base and which in turn supports said individual weighing scales and containers; and an interlock means between said master scale and said dump valve actuating means, whereby the latter cannot be actuated unless said master scale is supporting a predetermined maximum weight of measured ingredients.

14. A weighing device adapted for weighing up a composite mixture of predetermined content including: a base support; a plurality of supply means, each for feeding a particular ingredient to go into said mixture; a feed gate attached to each of said supply means; individual means to actuate each of said feed gates; an ingredient-receiving container adjacent each of said gates; means for emptying each of said containers; an individual weighing scale which supports each of said containers; a master weighing scale supported on said base and which in turn supports said individual weighing scales and containers; and an interlock means between said master scale and said feed gate actuating means, whereby the latter cannot be actuated unless said master scale is supporting a predetermined minimum weight of ingredients.

15. In a device for weighing out a plurality of different ingredients, the combination of a rigid main frame; a master scale means supported on said rigid main frame; a plurality of containers and individual scale means for each container supported by said master scale means; separate means for feeding ingredients into each of the weighing containers; individual control means for opening and closing each of said feeding means; and a master control of said master scale means interlocked with said individual control means whereby said feeding means cannot be opened unless a predetermined minimum weight is indicated on said master scale means.

16. In a batching plant, adapted to measure out batches of like composition of ingredients, the combination of a plurality of containers each adapted to receive one of said ingredients; means for emptying said containers; a common support means for said containers; an individual weighing mechanism separately securing each of said containers to said common support; a separate weighing mechanism supporting said common support means; and lock means for said separate weighing mechanism and said emptying means, whereby said emptying means cannot be activated unless said separate weighing mechanism is sustaining a predetermined load.

17. In a batching plant adapted for weighing up separately and simultaneously and then discharging simultaneously a plurality of aggregates, the combination of a plurality of receptacles each containing aggregates to be used in a batch; a batch container positioned adjacent each of said receptacles to receive aggregates therefrom; an outlet device for each container; means for opening and closing said outlet device; a master scale frame; a separate scale for each container secured to and supporting each container in said frame; a master scale supporting said master scale frame; and a dumping circuit having means for opening said outlet devices only when said master scale is in the region of its weighing position which represents the total of the aggregates intended to be weighed into said individual batch containers.

BERT NOBLE.

REFERENCES CITED

The following references are of record in the file of this patent:

UNITED STATES PATENTS

| Number | Name | Date |
| --- | --- | --- |
| Re. 20,141 | Bliss | Oct. 27, 1936 |
| 2,425,685 | Pinder | Aug. 12, 1947 |

FOREIGN PATENTS

| Number | Country | Date |
| --- | --- | --- |
| 152,208 | Great Britain | June 13, 1904 |